(12) United States Patent
Bahn et al.

(10) Patent No.: US 9,303,121 B2
(45) Date of Patent: Apr. 5, 2016

(54) TERMINALLY MODIFIED POLYOXYALKYLENE GLYCOL AND POLYCARBONATE RESIN COMPOSITION HAVING IMPROVED OPTICAL CHARACTERISTICS COMPRISING THE SAME

(71) Applicant: LG CHEM. LTD., Seoul (KR)

(72) Inventors: Hyong Min Bahn, Daejeon (KR); Un Ko, Daejeon (KR); Min Jeong Kim, Daejeon (KR); Hyun Jung Ryu, Daejeon (KR); Jae Chan Park, Daejeon (KR); Jung Jun Park, Daejeon (KR); Ki Heung Yoo, Daejeon (KR); Ki Jae Lee, Daejeon (KR); Byeong Hoon Lee, Daejeon (KR); Byoung Kue Chun, Daejeon (KR); Moo Ho Hong, Daejeon (KR); Young Young Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/433,825

(22) PCT Filed: Aug. 29, 2014

(86) PCT No.: PCT/KR2014/008099
§ 371 (c)(1),
(2) Date: Apr. 6, 2015

(87) PCT Pub. No.: WO2015/030535
PCT Pub. Date: Mar. 5, 2015

(65) Prior Publication Data
US 2015/0247003 A1    Sep. 3, 2015

(30) Foreign Application Priority Data

Aug. 29, 2013  (KR) .................. 10-2013-0103118
Aug. 29, 2014  (KR) .................. 10-2014-0114085

(51) Int. Cl.
| | |
|---|---|
| C08G 65/08 | (2006.01) |
| C08G 65/331 | (2006.01) |
| C08G 65/48 | (2006.01) |
| C08L 69/00 | (2006.01) |
| G02B 6/00 | (2006.01) |
| F21V 8/00 | (2006.01) |
| C08L 71/02 | (2006.01) |

(52) U.S. Cl.
CPC .............. *C08G 65/331* (2013.01); *C08G 65/48* (2013.01); *C08L 69/00* (2013.01); *G02B 6/00* (2013.01); *G02B 6/0065* (2013.01); *C08G 65/08* (2013.01); *C08G 2650/04* (2013.01); *C08L 71/02* (2013.01); *C08L 2205/06* (2013.01)

(58) Field of Classification Search
CPC .......... C08G 65/08; C08L 69/00; C08L 71/02
See application file for complete search history.

(56) References Cited

U.S. PATENT DOCUMENTS

| 6,127,459 A | 10/2000 | Stark et al. |
|---|---|---|
| 6,903,174 B2 * | 6/2005 | Harvey et al. .................. 526/273 |
| 2005/0130865 A1 | 6/2005 | Schmid et al. |

FOREIGN PATENT DOCUMENTS

| KR | 10-0795214 B1 | 1/2008 |
|---|---|---|
| KR | 10-2008-0105005 A | 12/2008 |
| KR | 10-2013-0090362 A | 8/2013 |

* cited by examiner

*Primary Examiner* — Richard A Huhn
(74) *Attorney, Agent, or Firm* — Dentons US LLP

(57) ABSTRACT

Disclosed are a terminally modified polyoxyalkylene glycol which may dramatically improve color uniformity and machinability, when applied to a polycarbonate resin transmittance, a polycarbonate resin composition comprising the same, and a light guide plate manufactured using the same.

8 Claims, No Drawings

TERMINALLY MODIFIED POLYOXYALKYLENE GLYCOL AND POLYCARBONATE RESIN COMPOSITION HAVING IMPROVED OPTICAL CHARACTERISTICS COMPRISING THE SAME

This application is a National Stage Entry of International Application No. PCT/KR2014/008099 filed Aug. 29, 2014, which claims priority to and benefit of Korean Application Nos. 10-2013-0103118 filed Aug. 29, 2013 and 10-2014-0114085 filed Aug. 29, 2014, in the Korean Intellectual Property Office, both of which are incorporated herein by reference.

TECHNICAL FIELD

The present invention relates to a terminally modified polyoxyalkylene glycol, a polycarbonate resin composition comprising the same, and a light guide plate manufactured using the same. More particularly, the present invention relates to terminally modified polyoxyalkylene glycol which may dramatically improve transmittance, color uniformity, and machinability, when applied to a polycarbonate resin, a polycarbonate resin composition comprising the same, and a light guide plate manufactured using the same.

BACKGROUND ART

Backlight units (BLUs) are used in LCDs for computers, mobile phones, PDAs and the like. BLUs are equipped with a light guide plate as a component providing luminance and uniform lighting.

The light guide plate may be manufactured by injection molding thermoplastic resins.

Conventionally, as a thermoplastic resin for a light guide plate, a polymethylmethacrylate resin, an aromatic polycarbonate resin, or the like was used. However, the polymethylmethacrylate resin is vulnerable to heat generated from devices such as computers, mobile phones, PDA, and the like, due to low heat-resistance thereof. Although the aromatic polycarbonate resin has excellent heat resistance, mechanical characteristics, electrical characteristics, and weather resistance, light transmittance (luminance), color uniformity, and the like are poor.

Accordingly, Japanese Application Pub. No. 2001-215336 introduced copolyestercarbonate having an aliphatic segment to improve light transmittance (luminance). However, there were drawbacks such as reduction of heat resistance.

DISCLOSURE

Technical Problem

Therefore, the present invention has been made in view of the above problems, and it is one object of the present invention to provide a terminally modified polyoxyalkylene glycol which may dramatically improve transmittance, color uniformity and machinability, when applied to a polycarbonate resin, a polycarbonate resin composition comprising the same, and a light guide plate manufactured using the same.

The above and other objects can be accomplished by the present invention described below.

Technical Solution

In accordance with one aspect of the present invention, provided is a terminally modified polyoxyalkylene glycol represented by Formula 1 below:

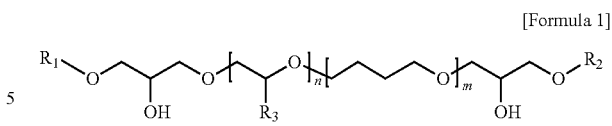

[Formula 1]

wherein $R_1$ and $R_2$ are a C1~C20 alkyl group, cycloalkyl group, or aryl group, $R_3$ is hydrogen or a methyl group, $10 \leq n+m \leq 100$, and n and m are 0 or a positive integer.

In accordance with another aspect of the present invention, provided is a polycarbonate resin composition comprising a polycarbonate resin and terminally modified polyoxyalkylene glycol represented by Formula 1.

In accordance with yet another aspect of the present invention, provided is a light guide plate manufactured from the polycarbonate resin composition.

Advantageous Effects

As apparent from the fore-going, the present invention provides a terminally modified polyoxyalkylene glycol which may dramatically improve color uniformity and machinability, when applied to a polycarbonate resin transmittance, a polycarbonate resin composition comprising the same, and a light guide plate manufactured using the same.

BEST MODE

Hereinafter, the present invention will be described in detail.

A terminally modified polyoxyalkylene glycol of the present invention is represented by Formula 1 below:

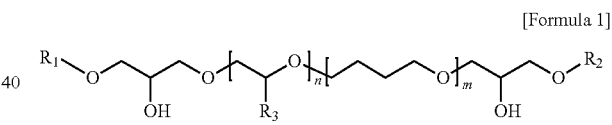

[Formula 1]

wherein $R_1$ and $R_2$ are a C1~C20 alkyl group, cycloalkyl group, or aryl group, $R_3$ is hydrogen or a methyl group, $10 \leq n+m \leq 100$, and n and m are 0 or a positive integer.

In one embodiment, n is an integer of 1 to 100, or an integer of 15 to 50.

In one embodiment, m is an integer of 0 to 99, or an integer of 12 to 45.

Arrangement of two monomers of the terminally modified polyoxyalkylene glycol is not specifically limited. In one embodiment, a block, alternating, or random copolymer is possible.

In one embodiment, a number-average molecular weight of the terminally modified polyoxyalkylene glycol may be 400 to 8000 g/mol, 500 to 4000 g/mol, or 1000 to 3000 g/mol. When the terminally modified polyoxyalkylene glycol is applied in the above amount to a polycarbonate resin, migration is low and transmittance is superior.

In one embodiment, $R_1$ and $R_2$ may be a C2 to C20 alkyl group or a C3 to C10 alkyl group. Within the above range, transmittance and machinability are superior.

A polycarbonate resin composition of the present invention comprises the polycarbonate resin and the terminally modified polyoxyalkylene glycol represented by Formula 1 below:

[Formula 1]

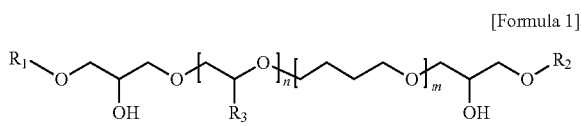

wherein $R_1$ and $R_2$ are a C1~C20 alkyl group, cycloalkyl group, or aryl group, $R_3$ is hydrogen or a methyl group, $10 \leq n+m \leq 100$, and n and m are 0 or a positive integer.

In one embodiment, the terminally modified polyoxyalkylene glycol may be comprised in an amount of 0.05 to 5 parts by weight, 0.1 to 3 parts by weight, 0.1 to 1.5 parts by weight, or 0.2 to 1 parts by weight, based on 100 parts by weight of the polycarbonate resin. Within the above range, transmittance and machinability are superior.

In one embodiment, the polycarbonate resin, which is not specifically limited, may be an aromatic polycarbonate resin. In this case, the polycarbonate resin has properties suitable for use as a light guide plate.

The aromatic polycarbonate resin may be a polycarbonate resin polymerized with an aromatic diol compound and a carbonate precursor.

In one embodiment, the aromatic diol compound may be one or more selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl) propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl) propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl) diphenylmethane, and α,ω-bis[3-(o-hydroxyphenyl)propyl] polydimethylsiloxane. Preferably, the aromatic diol compound is bisphenol A.

In one embodiment, the carbonate precursor is a compound represented by Formula 2 below:

[Formula 2]

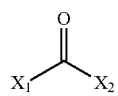

wherein $X_1$ and $X_2$ are independently a halogen, a haloalkyl group, a halocycloalkyl group, a haloaryl group, an alkoxy group, or a haloalkoxy group. Within the above range, intrinsic characteristics of the polycarbonate resin may be provided.

As another embodiment, the carbonate precursor may be one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene, and bishaloformate. Preferably, the carbonate precursor is triphosgene or phosgene.

In one embodiment, in polymerization of the aromatic polycarbonate resin, a molecular weight controller may be further comprised.

In one embodiment, the molecular weight controller is mono-alkyl phenol.

In one embodiment, the mono-alkyl phenol is one or more selected from the group consisting of p-tert-butylphenol, p-cumylphenol, decylphenol, dodecylphenol, tetradecylphenol, hexadecylphenol, octadecylphenol, eicosyl phenol, docosyl phenol, and triacontyl phenol. Preferably, the mono-alkyl phenol is para-tert-butylphenol.

In one embodiment, a weight average molecular weight of the polycarbonate resin is 12000 to 40000 g/mol, 13000 to 30000 g/mol, or 14000 to 25000 g/mol. Within the above range, a light guide plate having superior machinability and transmittance may be obtained.

In one embodiment, interfacial polymerization may be used to prepare a copolycarbonate resin of the present invention. In this case, polymerization is possible at normal pressure and low temperature, and molecular weight may be easily controlled.

In one embodiment, the interfacial polymerization method may be a method of reacting an aromatic diol compound and a carbonate precursor in the presence of an acid binder and an organic solvent.

In one embodiment, the interfacial polymerization method may comprise adding a coupling agent after pre-polymerization and then polymerizing again. In this case, a polycarbonate resin having a high molecular weight may be obtained.

Other materials used in the interfacial polymerization are not specifically limited so long as the materials may be used in polymerization of polycarbonate and use amounts thereof may be controlled as needed.

In one embodiment, the acid binder is an alkali metal hydroxide such as sodium hydroxide, potassium hydroxide, and the like, or an amine compound such as pyridine and the like.

The organic solvent is not specifically limited so long as the solvent may be used in general polymerization of polycarbonate. The organic solvent, for example, may be a halogenated hydrocarbon such as methylene chloride, chlorobenzene, or the like.

In one embodiment, in the interfacial polymerization, a reaction accelerator such as a tertiary amine compound comprising triethylamine and the like, a quaternary ammonium compound comprising tetra-n-butylammonium bromide and the like, and a quaternary phosphonium compound comprising tetra-n-butylphosphonium bromide and the like may be further used to accelerate the reaction.

In one embodiment, a reaction temperature of the interfacial polymerization is preferably 0 to 40° C., reaction time thereof is preferably 10 minutes to 5 hours, and pH during the reaction is preferably 9 or more, or 11 or more.

The interfacial polymerization method may further comprise a molecular weight controller.

In one embodiment, the molecular weight controller may be added before, during, or after initiation of the polymerization.

In one embodiment, a melt index (MI) measured according to ASTM D 1238, of the polycarbonate resin composition of the present invention may be 10 to 300 g/10 min, 15 to 260 g/10 min, or 30 to 200 g/10 min under a condition of 300° C. and 1.2 kg. Within this range, the polycarbonate resin composition has superior machinability and properties suitable for a light guide plate.

In one embodiment, transmittance of the polycarbonate resin composition having a thickness of 15 cm according to the present invention is minimally 77% or more, 81% or more, or 83% or more. In this case, the polycarbonate resin composition may be suitably used for a light guide plate.

In one embodiment, the polycarbonate resin composition may further comprise one or more selected from the group consisting of an antioxidant, a lubricant, a fluorescence brightening agent and a pigment.

The light guide plate of the present invention is characterized by being manufactured from the polycarbonate resin composition.

In one embodiment, the light guide plate may be manufactured by injection molding or extrusion molding the polycarbonate resin composition.

Hereinafter, preferred examples will be provided for better understanding of the present invention. It will be apparent to those skilled in the art that these examples are only provided to illustrate the present invention and various modifications and alterations are possible within the scope and technical range of the present invention. Such modifications and alterations fall within the scope of claims included herein.

EXAMPLE

Preparation Example 1

Preparation of PC-1

978.4 g of bisphenol A (BPA), 1,620 g of an aqueous 32% NaOH solution, and 7,500 g of distilled water were added to a 20 L glass reactor, and complete dissolution of BPA under nitrogen atmosphere was confirmed. Subsequently, 3,650 g of methylene chloride and 49.7 g of p-tert-butylphenol (PTBP) were added thereto and mixed. To the resultant mixture, 4,165 g of a methylene chloride solution (methylene chloride: 3,650 g), in which 515 g of triphosgene was dissolved, was added dropwise for 1 hour. Here, pH of an aqueous NaOH solution was maintained at 12. After completing addition of triphosgene, aging was carried out for 15 minutes and 10 g of triethylamine dissolved in methylene chloride was added thereto. After 15 minutes, pH thereof was adjusted to pH 1 using aqueous 1 N hydrochloric acid and then washing was carried out three times with distilled water. Subsequently, a methylene chloride phase was separated and then precipitated in methanol. As a result, a powdered polycarbonate resin (PC-1) was obtained.

Preparation Example 2

Preparation of PC-2

An experiment was carried out in the same manner as in Preparation Example 1, except that 41 g of PTBP was added. As a result, a powdered polycarbonate resin (PC-2) was obtained.

Preparation Example 3

Preparation of BGE-PPG1

1 kg of polypropylene glycol (PPG) having a molecular weight of 1,000 and 1 g (0.1 wt %) of KOH were added to a 2 L three-neck flask and then temperature was elevated up to 80° C. while stirring under $N_2$ atmosphere. Subsequently, 300 g of butylglycidyl ether (BGE) was added thereto and reacted for 2 hours. Subsequently, temperature was lowered to 25° C. and then phosphoric acid was added thereto to neutralize the mixture. Residues were removed by distilling under reduced pressure. As a result, BGE-PPG1 was prepared. Here, a yield of BGE-PPG1 was 92%.

Preparation Example 4

Preparation of BGE-PPG2

An experiment was carried out in the same manner as in Preparation Example 3, except that 1.2 kg of polypropylene glycol (PPG) having a molecular weight of 2,000g/mol and 180 g of BGE were used. As a result, BGE-PPG2 was prepared. Here, a yield of BGE-PPG2 was 91%.

Preparation Example 5

Preparation of EHGE-PPG

An experiment was carried out in the same manner as in Preparation Example 3, except that 1.2 kg of polypropylene glycol (PPG) having a molecular weight of 2,000 g/mol and 253 g of 2-ethylhexyl glycidyl ether (EHGE) were used. As a result, EHGE-PPG was prepared. Here, a yield of EHGE-PPG was 88.7%.

Examples 1 to 6 and Comparative Examples 1 to 5

Materials disclosed in Table 1 below were melt mixed using a co-rotating twin screw extruder (diameters of screws: 27 mm, L/D=48) according to composition ratios disclosed in Table 2 below to prepare polycarbonate resin composition pellets. The prepared pellets were dried and then prepared into specimens using an injection molding machine. Here, to all of the compositions, an antioxidant (Irgafos 168) was added in a constant amount (500 ppm). In this regard, description of contents obvious to a person of ordinary skill in the art was omitted.

TABLE 1

| Classification | Description | |
|---|---|---|
| PC-1 | Mw: 16,000 | |
| PC-2 | Mw: 21,000 | |
| BGE-PPG1 | Mn: 1,000 | Butylglycidyl ether capped polypropylene glycol |
| BGE-PPG2 | Mn: 2,000 | Butylglycidyl ether capped polypropylene glycol |
| EHGE-PPG | Mn: 2,000 | 2-Ethylhexyl glycidyl ether capped polypropylene glycol |
| PPG | Mn: 2,000 | Polypropylene glycol |
| PTMG | Mn: 2,000 | Polytetramethylene glycol |
| NKL-9520* | Mn: 2,000 | Polypropylene glycol distearate |

*Unisafe NKL-9520 available from NOF

TABLE 2

| Classification (Unit: parts by weight) | PC-1 | PC-2 | BGE-PPG1 | BGE-PPG2 | EHGE-PPG | PPG | PTMG | NKL 9520 |
|---|---|---|---|---|---|---|---|---|
| Example 1 | 100 | | 0.3 | | | | | |
| Example 2 | 100 | | | 0.3 | | | | |
| Example 3 | 100 | | | | 0.3 | | | |

TABLE 2-continued

| Classification (Unit: parts by weight) | PC-1 | PC-2 | BGE-PPG1 | BGE-PPG2 | EHGE-PPG | PPG | PTMG | NKL 9520 |
|---|---|---|---|---|---|---|---|---|
| Comparative Example 1 | 100 | | | | | 0.3 | | |
| Comparative Example 2 | 100 | | | | | | 0.3 | |
| Comparative Example 3 | 100 | | | | | | | 0.3 |
| Example 4 | | | 100 | 0.3 | | | | |
| Example 5 | 100 | | | 0.1 | | | | |
| Example 6 | 100 | | | 0.2 | | | | |
| Comparative Example 4 | 100 | | | | | | | |
| Comparative Example 5 | | 100 | | | | | | |

Experimental Example

Properties of the polycarbonate resin composition specimens prepared according to Examples 1 to 6 and Comparative Examples 1 to 5 were measured according to methods below. Results are summarized in Table 3 below.
  Weight average molecular weight: measured using GPC with a PC Standard.
  Number-average molecular weight: measured using GPC
  Melt index (MI): measured according to ASTM D1238 under conditions of 300° C. and 1.2 kg.
  Heat resistance (ASTM D 1925): specimens, where width×length×thickness=60 mm×40 mm×3 mm, were injection molded at each of 250° C. and 320° C., and YI values thereof were compared.
  Transmittance of long-wavelength light (T %) and color of long-wavelength light (YI): specimens, where width×length×thickness=150 mm×80 mm×4 mm, were injection molded, and transmittance (transmittance of long-wavelength light) and color stability (color of long-wavelength light) thereof were measured by perpendicularly irradiating light to a thickness of the specimens using a spectrophotometer, U-4100, available from Hitachi.

TABLE 3

| Properties | Machinability (MI) | Heat resistance (ΔYI) | Color of long-wavelength light (YI) | Transmittance of long-wavelength light (T %) |
|---|---|---|---|---|
| Example 1 | 77.41 | 0.19 | 5.61 | 84.16 |
| Example 2 | 76.04 | 0.16 | 5.41 | 84.75 |
| Example 3 | 79.32 | 0.18 | 5.48 | 84.32 |
| Comparative Example 1 | 74.12 | 0.31 | 6.21 | 83.11 |
| Comparative Example 2 | 72.14 | 0.28 | 6.85 | 82.18 |
| Comparative Example 3 | 76.12 | 0.41 | 8.54 | 81.56 |
| Example 4 | 38.85 | 0.18 | 5.81 | 82.48 |
| Example 5 | 71.89 | 0.19 | 5.78 | 80.36 |
| Example 6 | 74.01 | 0.17 | 5.61 | 80.45 |
| Comparative Example 4 | 68.21 | 0.84 | 12.42 | 74.36 |
| Comparative Example 5 | 34.47 | 0.95 | 13.45 | 67.86 |

As shown in Table 3, it can be confirmed that the polycarbonate resin composition (Examples 1 to 6) of the present invention has excellent machinability, heat resistance, color uniformity, and transmittance, when compared with the polycarbonate resin compositions (Comparative Examples 1 to 5) not comprising the terminally modified polyoxyalkylene glycol according to the present invention.

What is claimed is:

1. Terminally modified polyoxyalkylene glycol represented by Formula 1 below:

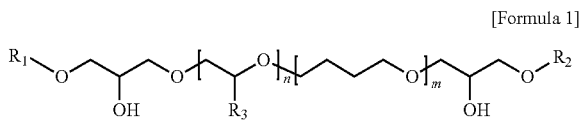

[Formula 1]

wherein $R_1$ and $R_2$ are a C1~C20 alkyl group, cycloalkyl group, or aryl group, $R_3$ is hydrogen or a methyl group, $10 \leq n+m \leq 100$, and n and m are 0 or a positive integer.

2. The terminally modified polyoxyalkylene glycol according to claim 1, wherein a number-average molecular weight of the terminally modified polyoxyalkylene glycol is up to 8,000 g/mol.

3. A polycarbonate resin composition comprising a polycarbonate resin and terminally modified polyoxyalkylene glycol represented by Formula 1 below:

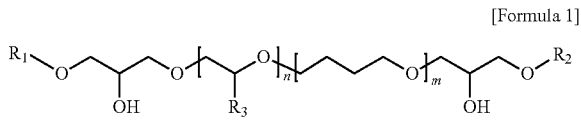

[Formula 1]

wherein $R_1$ and $R_2$ are a C1~C20 alkyl group, cycloalkyl group, or aryl group, $R_3$ is hydrogen or a methyl group, $10 \leq n+m \leq 100$, and n and m are 0 or a positive integer.

4. The polycarbonate resin composition according to claim 3, wherein an amount of the terminally modified polyoxyalkylene glycol is 0.05 to 5 parts by weight based on 100 parts by weight of the polycarbonate resin.

5. The polycarbonate resin composition according to claim 3, wherein a weight average molecular weight of the polycarbonate resin is 12,000 to 40,000 g/mol.

6. A light guide plate manufactured from the polycarbonate resin composition according to claim 3.

7. A light guide plate manufactured from the polycarbonate resin composition according to claim 4.

8. A light guide plate manufactured from the polycarbonate resin composition according to claim 5.

* * * * *